(12) United States Patent
Kijima (10) Patent No.: US 6,856,352 B1
(45) Date of Patent: Feb. 15, 2005

(54) IMAGE PICK-UP APPARATUS

(75) Inventor: Takayuki Kijima, Akiruno (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/447,338

(22) Filed: Nov. 22, 1999

(30) Foreign Application Priority Data

Nov. 24, 1998 (JP) ............................................. 10-332456

(51) Int. Cl.[7] ............................................... H04N 5/335
(52) U.S. Cl. ..................................... 348/312; 348/372
(58) Field of Search ................................. 348/311, 312, 348/482, 483, 372; 250/208.1; 358/482, 483

(56) References Cited

U.S. PATENT DOCUMENTS 5,748,340 A * 5/1998 Shimizu ...................... 358/482
5,767,904 A * 6/1998 Miyake ........................ 348/362

FOREIGN PATENT DOCUMENTS

JP          3-195331          8/1991

* cited by examiner

Primary Examiner—Tuan Ho
Assistant Examiner—Heather R. Long
(74) Attorney, Agent, or Firm—Ostrolenk, Faber, Gerb & Soffen, LLP (57) ABSTRACT

An image pick-up apparatus including a CCD 1 generating an image signal, a timing generator 6 generating various kinds of timing signals for controlling operation timings of CCD, a V driver 30 generating various kinds of driving signals for driving CCU in response to the timing signals, a power supply circuit 31 generating a power supply voltage $V_{DD}$ applied to the timing generator and V driver, and a CPU 8 controlling an application of the power supply voltage to the timing generator 6 and V driver 30 and controlling the operation of the timing generator. The CPU 8 has a first operation mode, in which the timing generator is set into a standby mode such that a leak current from the timing generator to the V driver is avoided when the power supply Voltage is not applied to the V driver, and a second operation mode, in which the timing generator is set into a normal operating condition after the power supply voltage has been applied to the V driver. It is no longer necessary to provide a buffer at an input of the V driver 30, and the leak current can be effectively avoided without increasing a cost of the apparatus.

8 Claims, 9 Drawing Sheets

IMAGE PICK-UP APPARATUS

BACKGROUND OF THE INVENTION

1. Field of the Invention

The present invention relates to an image pick-up apparatus such as electronic still camera and video camera including an image sensing element for producing an image signal.

2. Description of the Related Art

Figure 1:
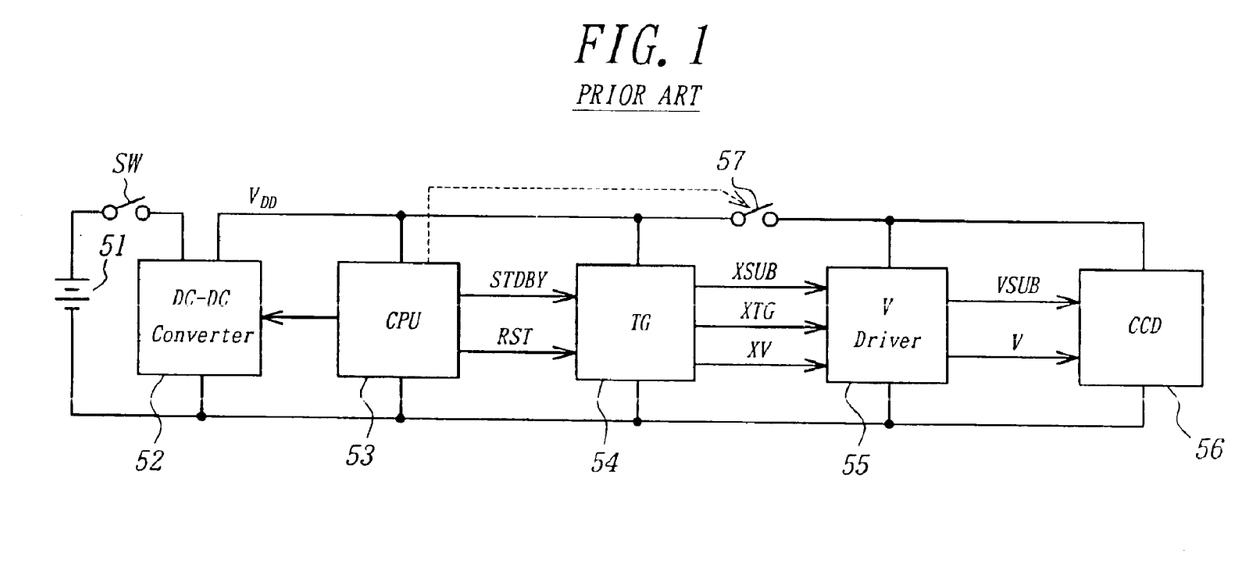
FIG. 1 is a block diagram showing a known image pick-up apparatus.

FIG. 1 is a block diagram showing a known image pick-up apparatus. The image pick-up apparatus comprises a DC power supply source 51, DC—DC converter 52, central processing nit (CPU) 53, timing generator (TG) 54, vertical driver (V) 55 and charge coupled device (CCD) 56. The DC power supply source 51 supplies a power supply voltage $V_{DD}$ having a given value to the CPU 53 and TG 54 via the DC—DC converter 52 as well as to the V driver 55 and CCD 56 by means of a switch 57. TG 54 supplies sub-pulse timing signal XSUB, transfer gate pulse timing signal XTG and transfer pulse timing signal for a vertical shift register to the V driver 55 under the control of CPU 53. In response to these timing signals, the V driver 55 supplies sub-pulse VSUB and vertical shift register transfer pulse V to CCD 56, and CCD operates under the control of these timing pulses.

Now it is assumed that CCD 56 is of a vertical overflow drain type, and the sub-pulse timing signal XSUB is a timing signal for generating the sub-pulse VSUB which serves to discharge electrostatic charge stored in a photodiode in a vertical direction, said photodiode constituting a light receiving element. The transfer gate pulse timing signal XTG serves to transfer electrostatic signal charges stored in the photodiodes of CCD 56 into the vertical shift register. The vertical shift register transfer pulse timing signal XV is a timing signal for transferring the signal charges in the vertical shift register into a horizontal shift register. A vertical shift register transfer pulse V is generated on the basis of these transfer gate pulse timing signal XTG and vertical shift register transfer pulse timing signal XV.

Figures 2A, 2B:
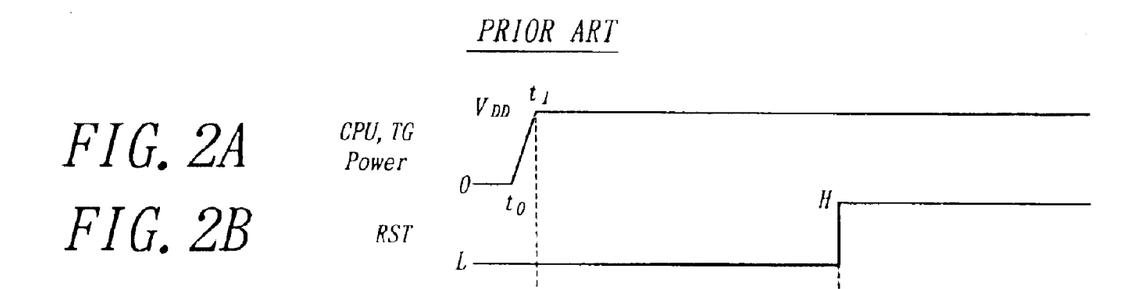
FIGS. 2A–2F are timing charts representing the operation of the known image pick-up apparatus.

In the conventional image pick-up apparatus shown in FIG. 1, when a main switch SW is closed at an instant to (see FIG. 2A), at first CPU 53 is initialized and a given process is executed in accordance with a program stored in an internal ROM in CPU. Then, DC—DC converter 52 is actuated by CPU 53 and begins to supply a given power supply voltage $V_{DD}$ to CCD 53 and TG 54 from an instant $t_1$ as shown in FIG. 2A. At this time, all power supply voltages including $V_{DD}$ are not applied to the V driver 55 and CCD 56 as illustrated in FIG. 2D.

Usually the V driver 55 is constructed such that the V driver is made active when signals supplied to various input terminals thereof are in a low logic level L. Therefore, in the condition that the power supply voltages are not applied to the V driver 55 and CCD 56, CPU 53 supplies a control signal STDBY having the lower logic level L to TG 54 to keep TG in a standby condition as shown in FIG. 2C, and therefore the timing signals XSUB and XV supplied from TG 54 to the V driver 55 are set to a non-active high level H as depicted in FIG. 2E.

Figure 2C:
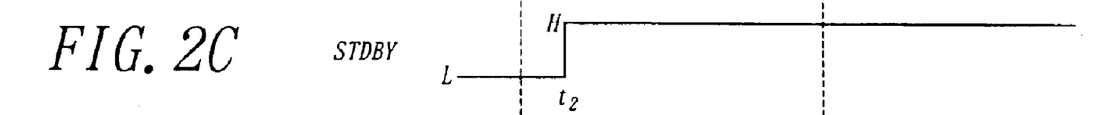
Figure 2D:
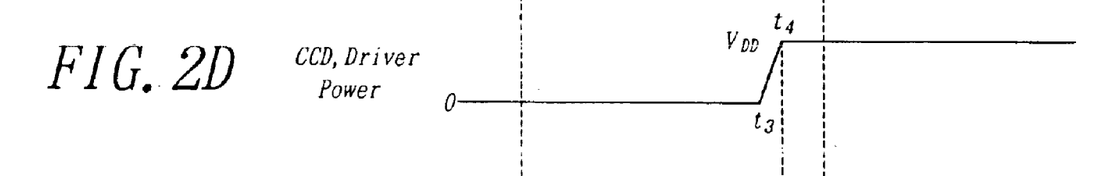
Figures 2E, 2F:
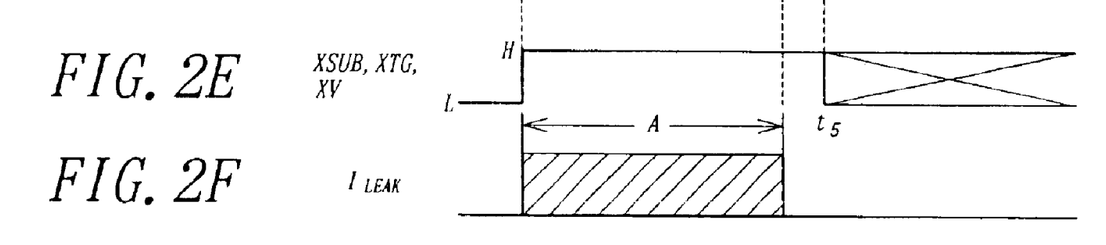

After that, as illustrated in FIG. 2C, at an instant $t_2$, the control signal STDBY supplied from TG 54 to the V drive 55 is changed from the logic low level L to the logic high level H. Then, an internal clock generator provided in TG 54 is actuated to produce an internal clock, after a given time period during which the oscillation of the internal clock has become stable, the switch 57 is closed at an instant $t_3$ and the supply of the power supply voltages including $V_{DD}$ to the V driver 55 and CCD 56 is initiated at an instant $t_4$ as depicted in FIG. 2D. After a given time period, a reset signal RST is changed from L to H to initialize internal logic circuits of TG 54 at an instant $t_5$ (see FIG. 2B). After that, TG 54 operates in a normal manner to supply the timing signals XSUB, XTG and XV to the V driver 55 as shown in FIG. 2E.

Figure 3:
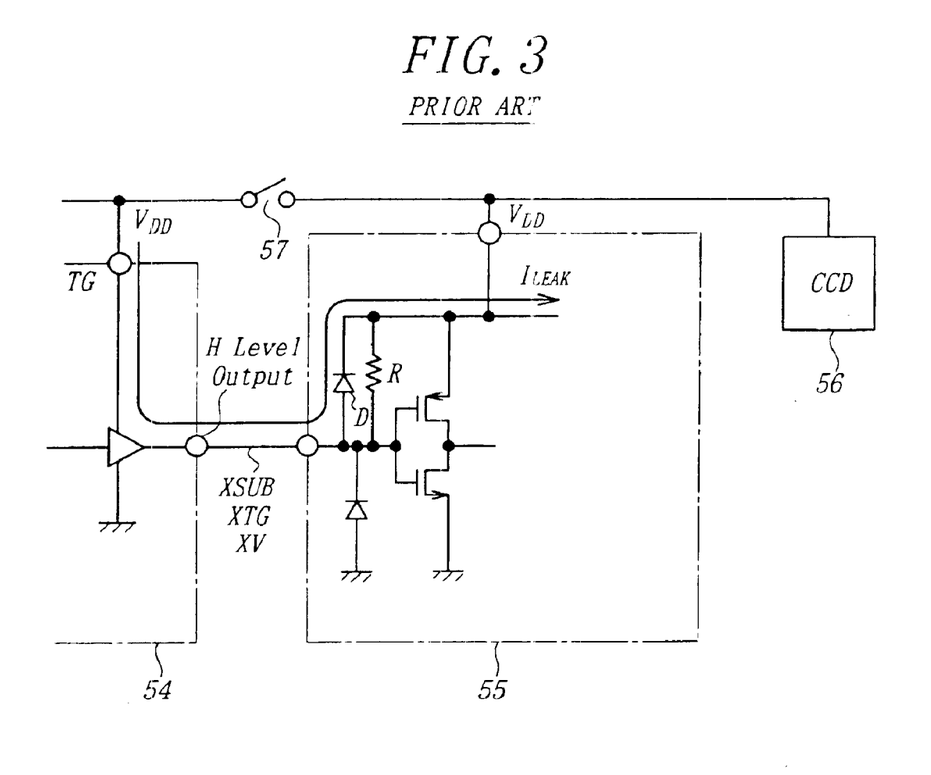
FIG. 3 is a circuit diagram for explaining a problem in the known image pick-up apparatus.

In the known image pick-up apparatus, during a time period A from $t_1$ at which the power supply voltage $V_{DD}$ is applied to CPU 53 and TG 54 to $t_4$ at which the V driver 55 and CCD 56 begin to operate normally after the application of the power supply voltage $V_{DD}$ (see FIG. 2E), the respective timing signals XSUB, XTG and XV having the non-active high level H are supplied from the TG 54 to the V driver 55. Then, a leak current $I_{LEAK}$ might flow from TG 54 into the V driver 55 by means of a diode D provided in a protection circuit, a pull-up resistor R and other circuit elements provided in TG 54 as shown in FIG. 3. This leak current $I_{LEAK}$ flowing into the V driver 55 might amount to a power supply current having a very large magnitude, and therefore an internal circuits of the V driver 55 might be affected by the leak current, and in an extreme case, the V driver might be broken.

In order to avoid such a problem of the leak current, one may consider to provide a buffer in an input stage of the V driver 55 utilizing the teachings disclosed in Japanese Patent Application Laid-open Publication Kokai Hei 3-195331. However, it is apparent that such a solution raises a cost of the image pick-up apparatus.

SUMMARY OF THE INVENTION

The present invention has for its object to provide a novel and useful image pick-up apparatus, in which the generation of the abnormal leak current during the above mentioned time period from an application of a power supply voltage to the timing generator TG to an application of a power supply voltage to the V driver can be avoided without increasing a cost.

According to the invention, an image pick-up apparatus comprises:

an image sensing element generating an image signal;

timing signal generating means for supplying timing signals for controlling an operation of said image sensing element;

a driving circuit converting said timing signals generated by said timing signal generating means into driving signals for driving said image sensing element; and a power supply circuit for supplying a power supply voltage to said driving circuit;

wherein said timing signal generating means is constructed such that the timing signal generating means changes output signals in accordance with a fact whether or not the power supply voltage is applied from said power supply circuit to said driving circuit.

In the image pick-up apparatus according to the invention, said timing signal generating means includes a lower power consumption mode, in which the output signal supplied from the timing signal generating means to said driving circuit is changed in dependence upon a fact that whether or not the power supply voltage is applied from said power supply circuit to said driving circuit.

According to the invention, an image pick-up apparatus comprises:

an image sensing means having a plurality of image receiving elements from which an image signal is read out;

a timing signals generating means for generating various timing signals which control operation timings of said image sensing means;

a driving circuit means for generating various driving signals for driving said image sensing means in response to said various timing signals generated by said timing signal generating means;

a power supply circuit means for generating at least one power supply voltage to be applied to said timing signal generating means and driving circuit means; and a controlling means for controlling an operation of said timing signal generating means as well as an application of said power supply voltage to said driving circuit means, and having a first operation mode, in which said timing signal generating means is set to a standby mode such that a leak current from said timing signal generating means to said driving circuit means is avoided when the power supply voltage is not applied from said power supply circuit means to said driving circuit means, and a second operation mode, in which said timing signal generating means is set to a normal operating condition after the power supply voltage has been applied from said power supply circuit means to said driving circuit means.

In a preferable embodiment of the image pick-up apparatus according to the invention, when said controlling means is in said first operation mode, an internal clock generator provided in said timing signal generating means is actuated to generate said timing signals just before an instant at which the power supply voltage is applied from said power supply circuit means to said driving circuit means, but the controlling means is in an inhibited condition in which an output of said timing signals to said driving circuit means is inhibited even after the power supply voltage is applied from said power supply circuit means to said driving circuit means.

In another preferable embodiment of the image pick-up apparatus according to the invention, when said controlling means is in said second operation mode, the controlling means releases said inhibited condition in which the supply of the generated timing signals to the driving circuit means is inhibited.

In another preferable embodiment of the image pick-up apparatus according to the invention, when said controlling means operates in said second operation mode in which the timing signal generating means generates said timing signals, said driving circuit means generates said driving signals on the basis of the timing signals and said image sensing means is driven by the driving signals, the controlling means further includes a first standby mode, in which a generation of an internal clock in the timing signal generating means is stopped while the application of said power supply voltage to said driving circuit means is maintained and the timing signals outputted from the timing signal generating means are set to a non-active logic level, and a second standby mode, in which the generation of the internal clock in the timing signal generating means is stopped, the application of said power supply voltage to said driving circuit means is stopped and the timing signals outputted from the timing signal generating means are set to an active logic level.

In another preferable embodiment of the image pick-up apparatus according to the invention, when said controlling means operates in said second operation mode in which the timing signal generating means generates said timing signals, said driving circuit means generates said driving signals on the basis of the timing signals and said image sensing means is driven by the driving signals, the controlling means further includes a reset mode, in which a generation of an internal clock in the timing signal generating means is maintained, the application of said power supply voltage to said driving circuit means is maintained and the timing signals outputted from the timing signal generating means are set to a non-active logic level.

In still another preferable embodiment of the image pick-up apparatus according to the invention, when said controlling means operates in said second operation mode in which the timing signal generating means generates said timing signals, said driving circuit means generates said driving signals on the basis of the timing signals and said image sensing means is driven by the driving signals, the controlling means further includes a standby mode in which a generation of an internal clock in the timing signal generating means is stopped while the application of said power supply voltage to said driving circuit means is maintained, and a reset mode in which the application of said power supply voltage to said driving circuit means is stopped while the generation of the internal clock in the timing signal generating means is maintained.

DESCRIPTION OF THE PREFERRED EMBODIMENT

Figure 4:
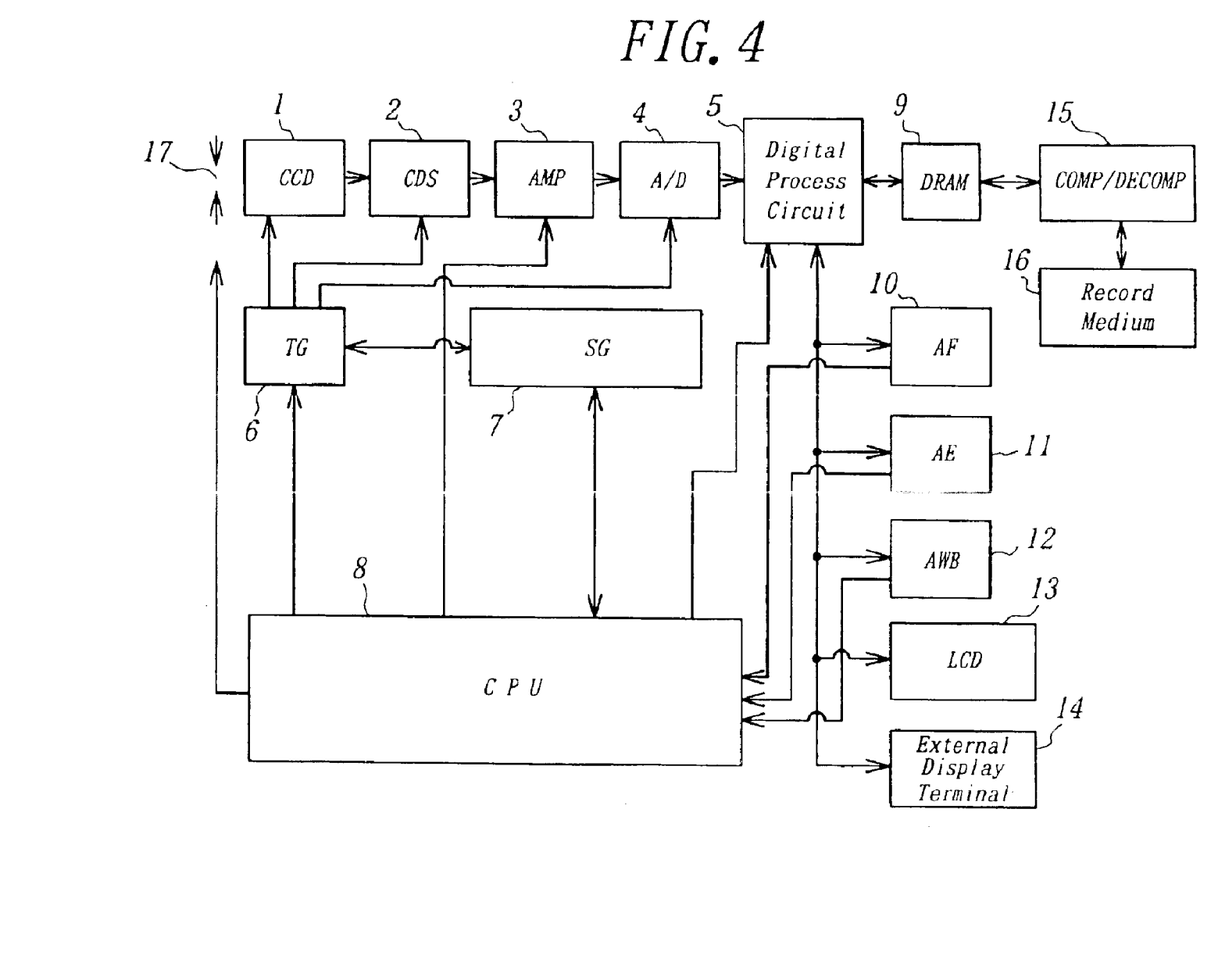
FIG. 4 is a block diagram depicting a first embodiment of the image pick-up apparatus according to the invention.

FIG. 4 is a block diagram showing a first embodiment of the image pick-up apparatus according to the invention. The image pick-up apparatus of the present embodiment is of a type in which a still picture is picked-up and a derived image signal is stored in a memory such as a digital camera. An optical image of an object to be picked-up is projected by a lens (not shown) onto a CCD 1 via a stop 17, and an image signal read out of CCD 1 is supplied to a correlation double sampling circuit (CDS) 2 to remove reset noise and others. An image signal from CDS 2 is supplied to an analog-digital converter (A/D) 4 via a gain control amplifier (AMP) 3. The thus converted digital image signal is then supplied to a digital process circuit 4 performing various video processing.

The image pick-up apparatus further comprises a timing generator (TG) 6 which generates various kinds of driving signals including a sample-hold pulse for CDS 2 and a timing pulse for A/D 4, a central processing unit (CPU) 8 which constitutes a reading out means for CCD 1 and controls the operation of the whole the image pick-up apparatus, and a signal generator (SG) 7 which produces a signal for synchronizing TG 6 and CPU 8 with each other.

There is further provided DRAM 9 constituting a memory for storing the image data read out of CCD 8. Moreover, there are arranged an auto-focus circuit (AF) 10 for performing the automatic focus control, an automatic exposure control circuit (AE) 11 for automatically controlling a brightness of an optical image projected onto the CCD 2, and an auto-white balance circuit (AWB) 12 for automatically controlling a white balance. Furthermore, a liquid crystal display (LCD) 13 displaying an image to be picked-up or has been picked-up, and a video output terminal 14 from which the image signal is supplied to an external monitor and so on.

There is provided a compression/decompression circuit (COMP/DECOMP) 15 for compressing the image data of one frame of a still picture stored in the DRAM 9 and decompressing the compressed image data read out of a record medium 16. The image data read out of the record medium 16 and decompressed by COMP/DECOMP 15 is stored in DRAM 9.

Figure 5:
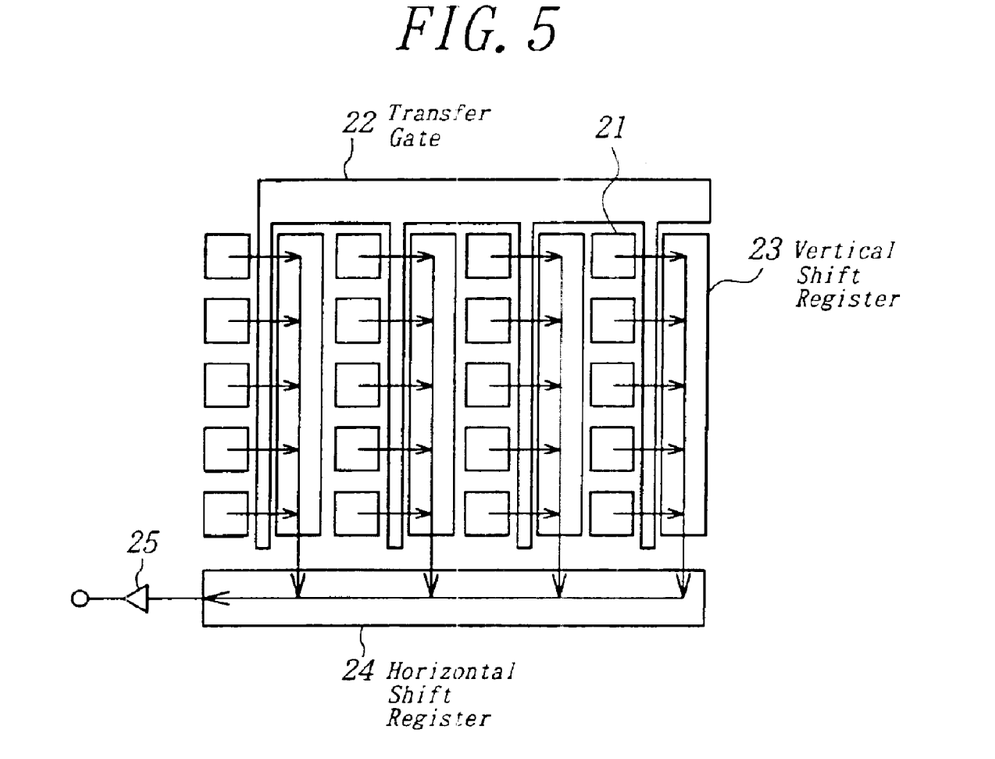
FIG. 5 is a schematic view showing an example of CCD shown in FIG. 4.

FIG. 5 is a schematic view showing an embodiment of CCD 1 shown in FIG. 4. This CCD 1 is of an interline type having the vertical overflow drain structure. CCD 1 comprises a number of photodiodes 21 arranged in a two-dimensional manner in the horizontal and vertical directions, each of said photodiodes constituting a region for storing an electrostatic charge in response to incident light. The electrostatic charges stored in the photodiodes 21 are supplied to a vertical shift register 23 via a transfer gate 22 in which the charges are transferred in the vertical direction. The thus transferred electrostatic charges are supplied to a horizontal shift register 24 and an output signal from this horizontal shift register is amplified by a signal detector 25.

The image pick-up apparatus illustrated in FIG. 4 operates in the following manner. In case of recording image data on the record medium 16, an image signal read out of CCD 1 is successively processed by CDS 3, AMP 3, A/D 4 and digital process circuit 5, and image data supplied from the digital process circuit 5 is supplied to LCD 13 and a picked-up image is displayed thereon. Then, a user can direct the image pick-up apparatus into a direction in which a desired image can be picked-up while the image displayed on LCD 13 is monitored. When an image pick-up or freeze button is depressed, the image data from the digital process circuit 5 is compressed by COMP/DECOPM 15 via DRAM 9 and the thus compressed image data is stored in the record medium 16.

In case of reproducing the image data stored in the record medium 16 is reproduced, the compressed image data read out of the record medium 16 is decompressed by COMP/DECOMP 15 and the thus decompressed image data is stored in DRAM 9. Then, the image data read out of DRAM 9 is supplied to LCD 13 via the digital process circuit 5 as well as to an external monitor via the external display terminal 14, and a still picture may be displayed on LCD 13 as well as on an external monitor.

Figure 6:
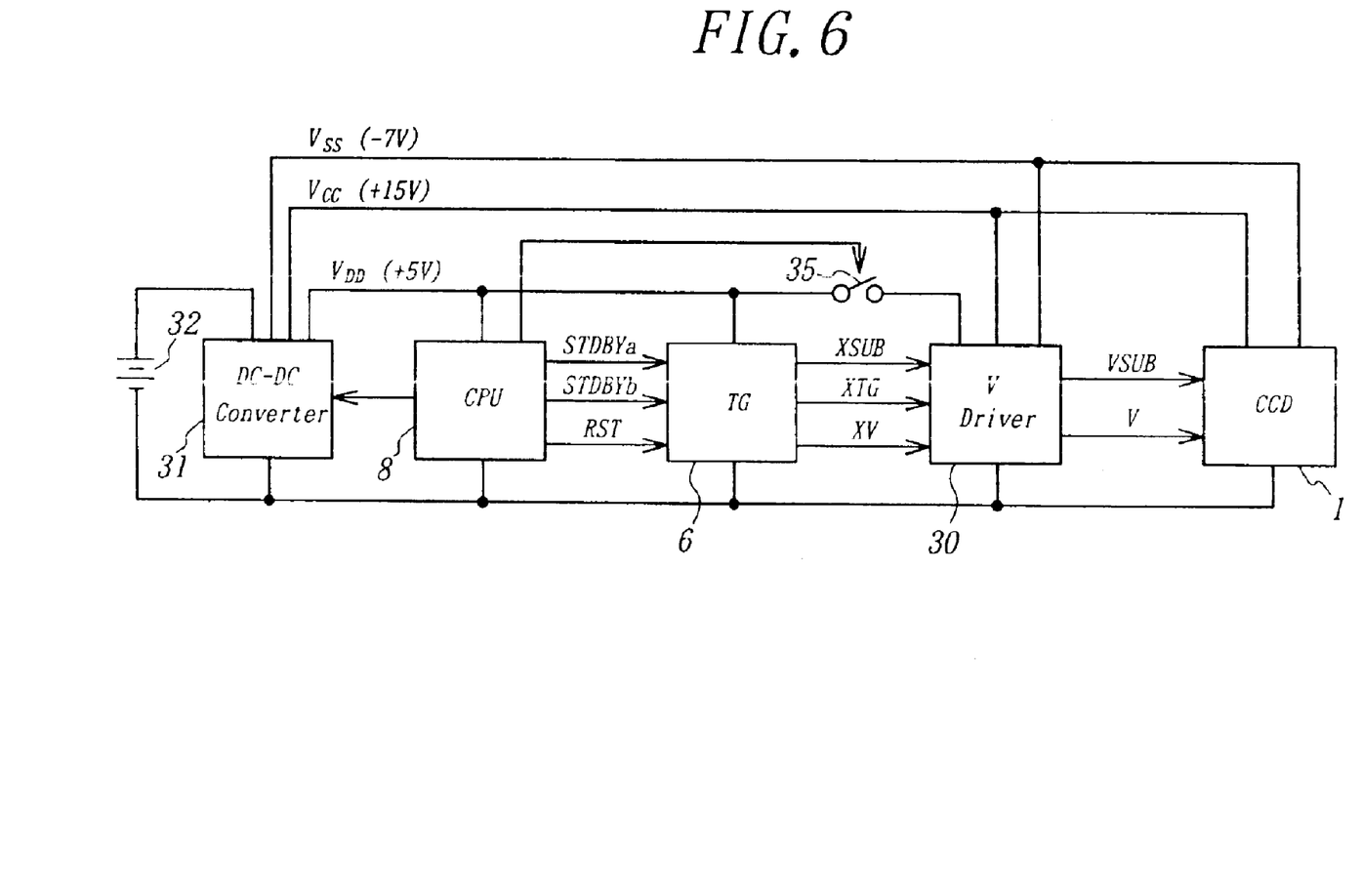
FIG. 6 is a block diagram illustrating a detailed structure of a part of the apparatus shown in FIG. 4.

FIG. 6 is a block diagram showing a more detailed structure of a portion surrounding CCD 1. In FIG. 6 there are shown DC power supply source 32 such as a battery, DC—DC converter 31, CPU 8, TG 6, V driver 30 and CCD 1. CPU 8 supplies, to TG 6, various signals for setting the operational mode of TG 6. In FIG. 6, control signals STDBYa and STDBYb for setting a standby mode of TG 6 (power save mode), and a reset signal RST for initializing an internal clock of TG 6 are shown.

TG 6 supplies a sub-pulse timing signal XSUB (FIG. 7B), a transfer gate pulse timing signal XTG (FIG. 7D) and a vertical shift register transfer pulse timing signal XV (FIG. 7D) to the V driver 30.

Figure 7A:
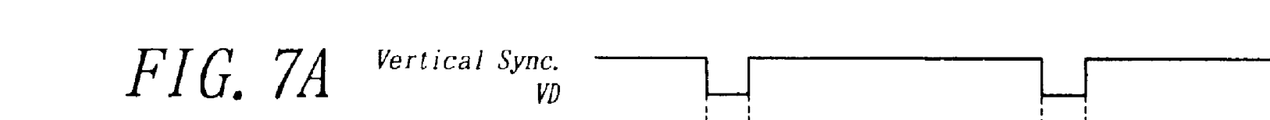
FIGS. 7A–7G are timing charts of input and output signals of a V driver illustrated in FIG. 6.
Figure 7B:
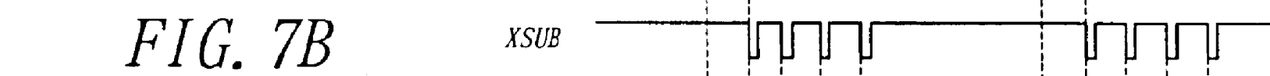
Figure 7C:
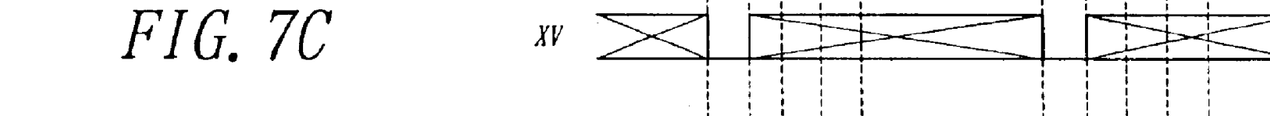
Figure 7D:
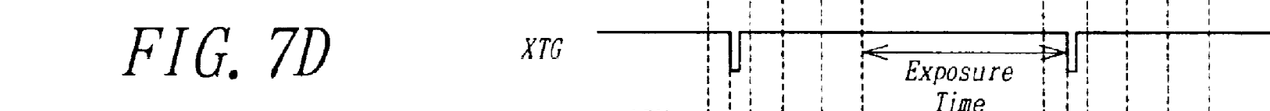
Figures 7E, 7F:
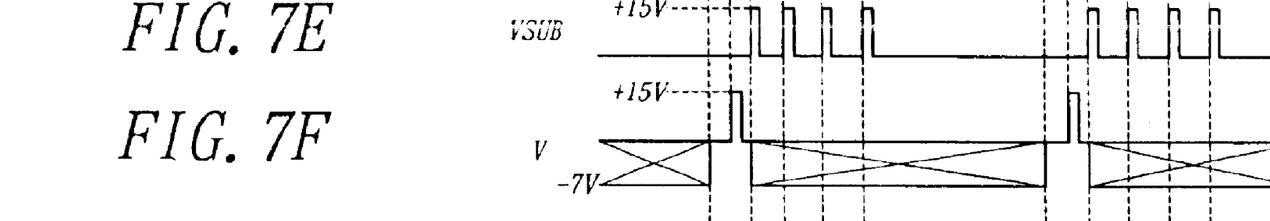
Figure 7G:
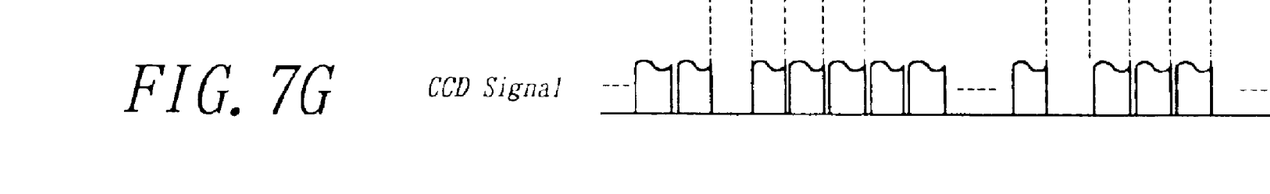

The V driver 30 is a vertical driver for driving CCD 1 and includes a vertical shift register driver and an overflow drain shutter driver. The V driver 30 supplies a sub-pulse (FIG. 7E) and a vertical shift register transfer pulse V (FIG. 7F) to CCD 1 in response to the various timing signals (XSUB, XTG, XV) from TG 6. FIG. 7A depicts a vertical synchronizing pulse VD for CCD 1.

The sub-pulse timing signal XSUB is a timing signal for generating the sub-pulse VSUB which serves to discharge the electrostatic charges stored in the photodiodes 21 of CCD 1 in the vertical direction. The transfer gate pulse timing signal XTG serves to transfer the signal charges stored in the photodiodes 21 of CCD 1 into the vertical shift register 23. The vertical shift register transfer pulse timing signal XV is a timing signal for transferring the signal charges in the vertical shift register 23 into the horizontal shift register 24. The vertical shift register transfer pulse V is generated on the basis of the transfer gate pulse timing signal XTG and vertical shift register transfer pulse timing signal XV. In the photodiodes 21, signal charges are stored therein during a time period from an instant at which the sub-pulse VSUB is generated to an instant at which the transfer gate pulse timing signal XTG, and therefore by controlling this time period, an exposure time can be controlled.

The DC—DC converter 31 is controlled by CPU 8 and generates various stable power supply voltages by increasing or decreasing an output voltage of the DC power supply source 32. The DC—DC converter 31 produces $V_{DD}$ (for instance +5.0 V), $V_{CC}$ (for instance +1.5 V) and $V_{SS}$ (for instance −7 V). $V_{DD}$ is applied to CPU 8 and TG 6 as a power supply voltage for a logic signal and is also applied to the V driver 30 by means of a switch 35 controlled by CPU 8. $V_{CC}$ and $V_{SS}$ are applied to CCD 1 and V driver 30, respectively as a driving power supply voltage.

In the present embodiment, TG 6 is controlled on the basis of the control signals STDBYa and STDBYb as shown in the following table 1.

TABLE 1

| STDBYa | STDBYb | Operation Mode | XSUB, XTG, XV |
|---|---|---|---|
| H | H | Normal Operation | Normal Operation |
| H | L | Standby 1 | H |
| L | H | Internal Clock On | L |
| L | L | Standby 2 | L |

In the Table 1, during the normal operation mode in which both the control signals STDBYa and STDBYb are in the logic high level H, CCD 1 conducts the signal storage and read out repeatedly with a rhythm of a frame. Therefore, in the normal operation mode, the internal clock in TG 6 is also made on. During the internal clock on mode set by the control signals STDBTa having the logical low level L and STDBTb having the logical high level H, although the internal clock is made on, the timing signals XSUB, STG and XV are set to the active level L.

In the standby 1 mode, in which the control signals STDBYa and STDBYb are set to H and L, respectively, the timing signals XSUB, STG and XV are set to the non-active level H, in the standby 2 mode in which both the control signals STDBYa and STDBYb are set to L, the timing signals XSUB, STG and XV are set to the active level L.

Figure 8A:
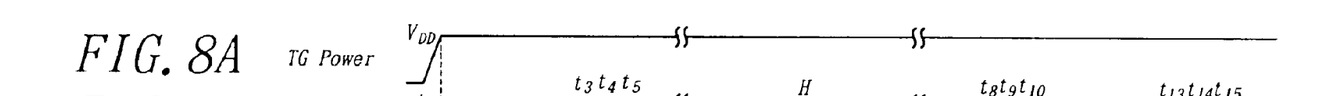
FIGS. 8A–8G are timing charts representing the operation of the first embodiment shown in FIG. 4.
Figure 8B:
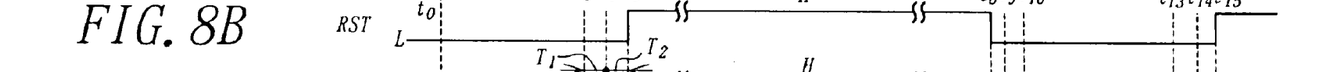
Figure 8C:
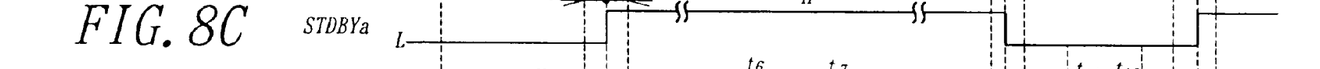
Figure 8D:
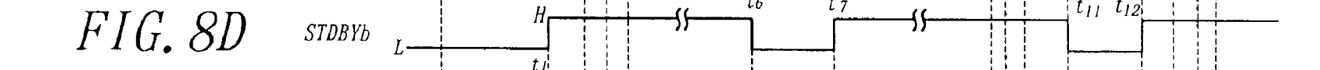

Now the operation of the image pick-up apparatus of the present embodiment will be explained with reference to timing charts shown in FIG. 8. At an instant $t_0$, a main switch SW is closed and the electric power is supplied to the apparatus, CPU 8 is initialized and the operation is started in accordance with a program stored in an internal ROM. At first, DC—DC converter 31 is actuated and the power supply voltage $V_{DD}$ is applied to CPU 8, TG 6 and other circuits (FIG. 8A). It should be noted that in this initializing time period, the power supply voltages $V_{DD}$, $V_{CC}$ and $V_{SS}$ are not applied to CCD 1 and V driver 30 as illustrated in FIG. 8E.

During the initializing time period, CPU 8 set the control signals STDBYa and STDBYb into L, and the various timing signals XSUB, STG and XV are set into the active low level L. Therefore, although the power supply voltage is not applied to the V driver 30, any leak current is not generated.

At an instant $t_1$, CPU 8 changes the control signal STDBYb into H (FIG. 8D) to set the internal clock on mode. Then, the internal clock in TG 6 is actuated to prepare the operation start.

Figure 8E:
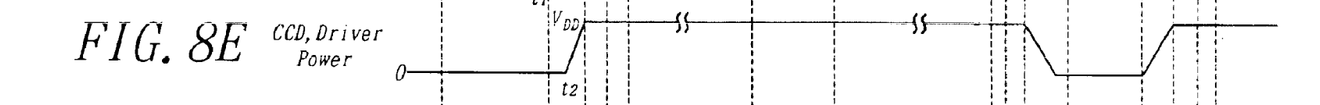
Figure 8F:
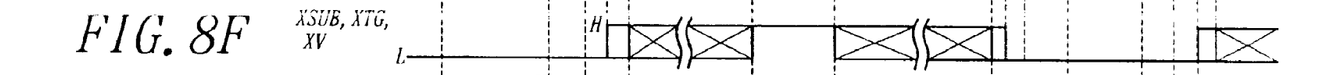
Figure 8G:
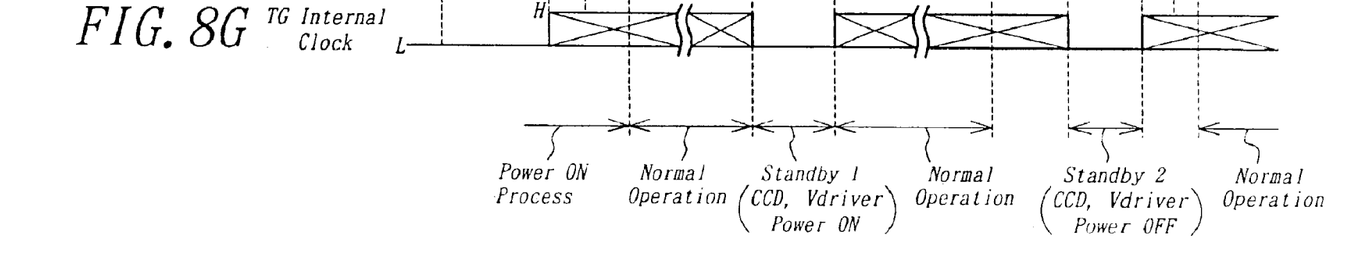

Next, CPU 8 controls the DC—DC converter 31 to generate the power supply voltages $V_{CC}$ and $V_{SS}$, and at an instant $t_2$, the switch 35 is closed and the application of the power supply voltage $V_{DD}$ is started from an instant $t_3$ (FIG. 8E).

After a time period $T_1$ during which the power supply voltages $V_{CC}$ and $V_{SS}$ become stable, CPU 8 changes the control signal STDBTa into the logic high level H (FIG. 8C) at an instant $t_4$ so that TG 6 is set to a normally operable condition. After a time period $T_2$, the rest signal RST is changed into H level at an instant $t_5$ (FIG. 8B) and the reset condition of the internal circuits of TG 6 is released. In response thereto, TG 6 supplies the various timing signals XSUB, XTG and XV to the V driver 30, and the V driver controls the storage and read-out of electrostatic charges in CCD 1.

Next, the standby 1 mode will be explained. In this standby 1 mode, the image pick-up operation is not performed, but the storage of the image data into the record medium 16 may be carried out, and the power consumption can be reduced. At an instant $t_6$, CPU 8 sets the control signals STDBYa and STDBYb into H and L levels, respectively, and the internal clock in TG 6 is stopped to reduce the power consumption, while the timing signals XSUB, XTG and XV are fixed to the non-active H level. It should be noted that in the standby 1 mode, since the power supply voltages $V_{CC}$ and $V_{SS}$ are applied to CCD 1 and V driver 30, although the timing signals XSUB, XTG and XV are in the non-active H level, no leak current flows.

In order to change the standby 1 mode into the normal operation mode, it is sufficient to change the control signal STDBYb into H level as shown by an instant $t_7$. Since the power supply voltages $V_{CC}$ and $V_{SS}$ are remained to be applied to CCD 1 and V driver 30, the normal operation mode can be recovered within a very short time period.

Next the standby 2 mode will be explained. At first, at an instant $t_8$, the reset signal RST is changed from H level to L level, and then at an instant $t_9$, the standby signal STDBYa is changed from H level to L level, while the standby signal STDBYa is remained in the H level. Therefore, the timing signals XSUB, XTG and XV are fixed to L level, but only the internal clock in TG is made on. After that, at an instant $t_{10}$, the switch 35 is opened and the application of the power supply voltages $V_{CC}$ and $V_{SS}$ to CCD 1 and V driver 30 is stopped. At an instant $t_{11}$, the control signal STDBYb is set to L level and the internal clock in TG is made off. In this manner, the apparatus is set to the standby 2 mode.

Therefore, in this standby mode 2, the power supply voltages $V_{DD}$, $V_{CC}$ and $V_{SS}$ are not applied to CCD 1 and V driver 30, the power consumption can be further reduced upon compared with the standby 1 condition.

In order to return the standby 2 mode into the normal operation mode, at first at an instant $t_{12}$, the control signal STDBYb is changed from L level to H level to make the internal clock on, and at the same time, the switch 35 is closed and the application of the power supply voltage $V_{DD}$ to the V driver 30 from the DC—DC converter 31 is initiated from an instant $t_{13}$. At the same time, the power supply voltages $V_{CC}$ and $V_{SS}$ are applied to CCD 1 and V driver 30. At an instant $t_{14}$, the control signal STDBYa is changed from H level to L level, and at an instant $t_{15}$, the reset signal RST is changed into H level. Therefore, in this case, the return from the standby 2 mode into the normal operation mode requires a longer time than the time period required for changing from the standby 1 mode into the normal operation mode.

TG 6 includes the internal clock generating circuit and the internal clock generated from this circuit is supplied to peripheral circuits. Therefore, during the internal clock off period (standby), the power supply voltage $V_{DD}$ is applied to TG 6 continuously and the internal clock generating circuit is operated.

Next, a second embodiment of the image pick-up apparatus according to the present invention will be explained. The structure of the image pick-up apparatus of the second embodiment is substantially same as that of the first embodiment, but operation timings are somewhat different from those of the first embodiment. In this embodiment, the operation modes of TG 6 are set as shown in the following Table 2 in accordance with a control signal STDBY and reset signal RST.

TABLE 2

| RST | STDBY | Operation Mode | XSUB, XTG, XV |
| --- | --- | --- | --- |
| H | H | Normal Operation | Normal Operation |
| H | L | Standby | H |
| L | H | Reset (internal clock ON) | L |
| L | L | Rest (internal clock OFF) | L |

In the Table 2, in the normal operation mode in which both the reset signal RST and control signal STDBY are set to the logical high level H, the signal storage and signal read-out are carried out in CCD 1 at a rhythm of the frame period. Therefore, in this normal mode operation, the internal clock of TG 6 is also made on. In the standby mode in which the reset signal RST is set to H level and the control signal STDBY is set to L level, the internal clock in TG 6 is made off to save the power supply, and the timing signals XSUB, XTG and XV are set to the non-active H level.

In the reset mode in which the reset signal RST is set to L level and the control signal STDBY is set to H level, the internal clock of TG 6 is made on and the timing signals XSUB, XTG and XV are set to the active L level. In the other reset mode in which both the reset signal RST and control signal STDBY are set to L level, the internal clock of TG 6 is made on and the timing signals XSUB, XTG and XV are set to the active L level.

Figures 9A, 9B:
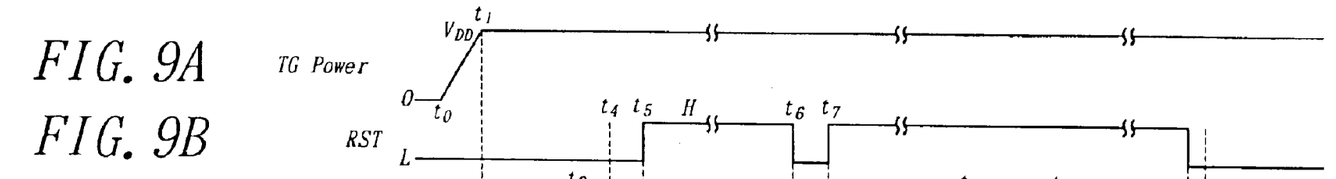
FIGS. 9A–9F are timing charts showing the operation of second embodiment of the image pick-up apparatus according to the invention.
Figure 9C:
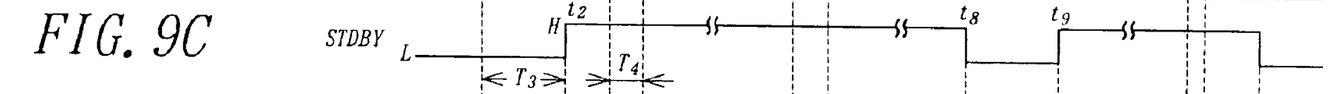
Figure 9D:
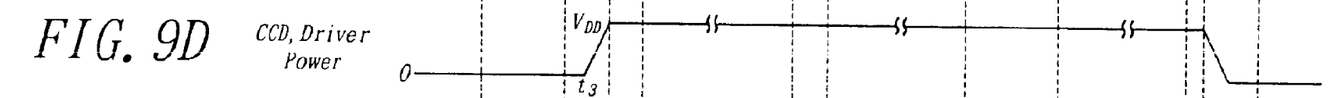
Figure 9E:
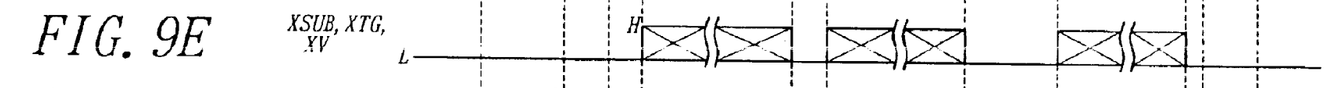
Figure 9F:
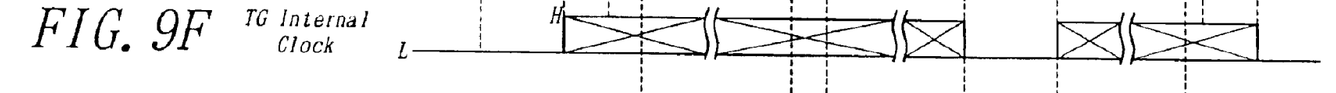

Now the operation of the second embodiment of the image pick-up apparatus according to the invention will be explained in accordance with timing charts shown in FIG. 9. At an instant to, a main switch SW is closed and the electric power is supplied to the apparatus, and CPU 8 is initialized like as the first embodiment in accordance with a program stored in an internal ROM. At first, the DC—DC converter 31 is actuated and the power supply voltage $V_{DD}$ is applied to CPU 8, TG 6 from an instant $t_1$ (FIG. 9A). During this initializing time period, the power supply voltages $V_{DD}$, $V_{CC}$ and $V_{SS}$ are not applied to CCD 1 and V driver 30 (FIG. 9D).

During the initializing time period, CPU 8 set the control signals STDBYa and STDBYb into L, and the various timing signals XSUB, STG and XV are set into the active low level L. Therefore, although the power supply voltage is not applied to the V driver 30, any leak current is not generated.

CPU 8 sets the reset signal RST (FIG. 9B) and control signal STDBY (FIG. 9C) to L level and TG 6 is set into the reset mode. Therefore, the timing signals XSUB, STG and XV are set into the active low level L. In this reset mode, even if the power supply voltage $V_{DD}$ is not applied to the V driver 30, no leak current flows, because the timing signals XSUB, STG and XV have the active low level L.

After a given time period $T_3$, CPU 8 changes the control signal STDBY from L level to H level at an instant $t_2$ to actuate the internal clock in TG 6.

Next, CPU 8 controls the DC—DC converter 31 to generate the power supply voltages $V_{CC}$ and $V_{SS}$ for CCD 1 and V driver 30, and at an instant $t_3$, the switch 35 is closed and the application of the power supply voltage $V_{DD}$ is started from an instant $t_4$ (FIG. 9D).

After a time period $T_4$ during which the power supply voltages $V_{CC}$ and $V_{SS}$ become stable, CPU 8 changes the reset signal RST into H (FIG. 9B) at an instant $t_5$ so that TG 6 is set into the normal operation mode. Then, TG 6 supplies the various timing signals XSUB, XTG and XV to the V driver 30 (FIG. 9E), and the V driver controls the storage and read-out of electrostatic charges in CCD 1.

During the normal operation mode, when the reset signal RST is changed from H level to L level as shown by an instant $t_6$, although the internal clock in TG 6 is remained operative, the application of the timing signals XSUB, XTG and XV to the V driver 30 is inhibited. In this manner, the apparatus can be set into the reset mode. By changing the reset signal RST from L level into H level at an instant $t_7$, the reset mode can be returned into the normal operation mode.

In the standby mode in which the image pick-up operation is not performed, but the storage of the image data into the record medium 16 may be carried out, at an instant $t_8$, CPU 8 sets the reset signal RST and control signal STDBY into H and L levels, respectively to save the power supply. The timing signals XSUB, XTG and XV are fixed to the non-active H level. In the standby mode, since the power supply voltages $V_{CC}$ and $V_{SS}$ are applied to CCD 1 and V driver 30, although the timing signals XSUB, XTG and XV have the non-active H level, no leak current flows.

In order to change the operation mode from the standby mode into the normal operation mode, it is sufficient to change the control signal STDBY into H level as shown by an instant $t_9$. Since the power supply voltages $V_{CC}$ and $V_{SS}$ are remained to be applied to CCD 1 and V driver 30, the normal operation mode can be recovered within a very short time period.

As explained above in detail, according to the present invention, by controlling the operation mode of the driving control means in accordance with the application of the power supply voltages to the driver circuit, a leak current can be effectively avoided without providing a buffer at an input of the driving circuit. Therefore, the undesired increase in a cost of the image pick-up apparatus can be removed.

What is claimed is:

1. An image pick-up apparatus comprising:
   an image sensing element operable to generate an image signal;
   a timing signal generating arrangement to generate timing signals to control the image sensing element;
   a driving circuit operable to generate driving signals to drive the image sensing element, the driving signals being generated in accordance with the timing signals; and
   a power supply circuit operable to supply a first power supply voltage to the timing signal generating arrangement, and operable to supply a second power supply voltage to the image sensing element and to the driving circuit after the first power supply voltage is supplied to the timing signal generating arrangement;
   wherein the timing signal generating arrangement is controllable to operate in a plurality of operating modes, the plurality of operating modes including a standby mode, the timing signal generating arrangement generating the timing signals while operating in the standby mode so that leakage currents do not flow through the driving circuit before the second power supply voltage is supplied to the image sensing element and to the driving circuit.

2. The image pick-up apparatus of claim 1, wherein the timing signal generating arrangement includes a timing generator and the driving circuit includes a vertical transfer driver.

3. The image pick-up apparatus of claim 1, wherein the timing signal generating arrangement includes an internal clock generator to generate the timing signals, the timing signals being inhibited in the standby mode to avoid the flow of leakage current from the timing signal generating arrangement to the driving circuit while the second power supply voltage is not supplied to the driving circuit and to the image sensing element.

4. The image pick-up apparatus of claim 3, wherein the plurality of modes includes a normal operating mode, the timing signals not being inhibited when the controlling arrangement operates in the normal operating mode.

5. The image pick-up apparatus of claim 1, wherein the timing signal generating arrangement includes an internal clock generator to generate the timing signals, the standby mode including a first standby mode in which the second power supply voltage is supplied to the driving circuit and to the image sensing element, the clock generator of the timing signal generating arrangement is switched off, and the timing signals are set to non-active logic levels, the standby mode including a second standby mode, in which the second power supply voltage is not supplied to the driving circuit and to the image sensing element, the clock generator of the timing signal generating arrangement is switched off, and the timing signals are set to active logic levels.

6. The image pick-up apparatus of claim 1, wherein the timing signal generating arrangement includes an internal clock generator to generate the timing signals, the plurality of modes including a second standby mode, in which the second power supply voltage is supplied to the driving circuit and to the image sensing element, the clock generator of the timing signal generating arrangement is switched on, and the timing signals are set to active logic levels.

7. The image pick-up apparatus of claim 1, wherein the second power supply voltage includes two separate voltages supplied respectively to the driving circuit and to the image sensing element.

8. The image pick-up apparatus of claim 1, wherein the plurality of modes includes a normal operating mode, in which the timing signals are not forced to a preset level.

* * * * *